UNITED STATES PATENT OFFICE.

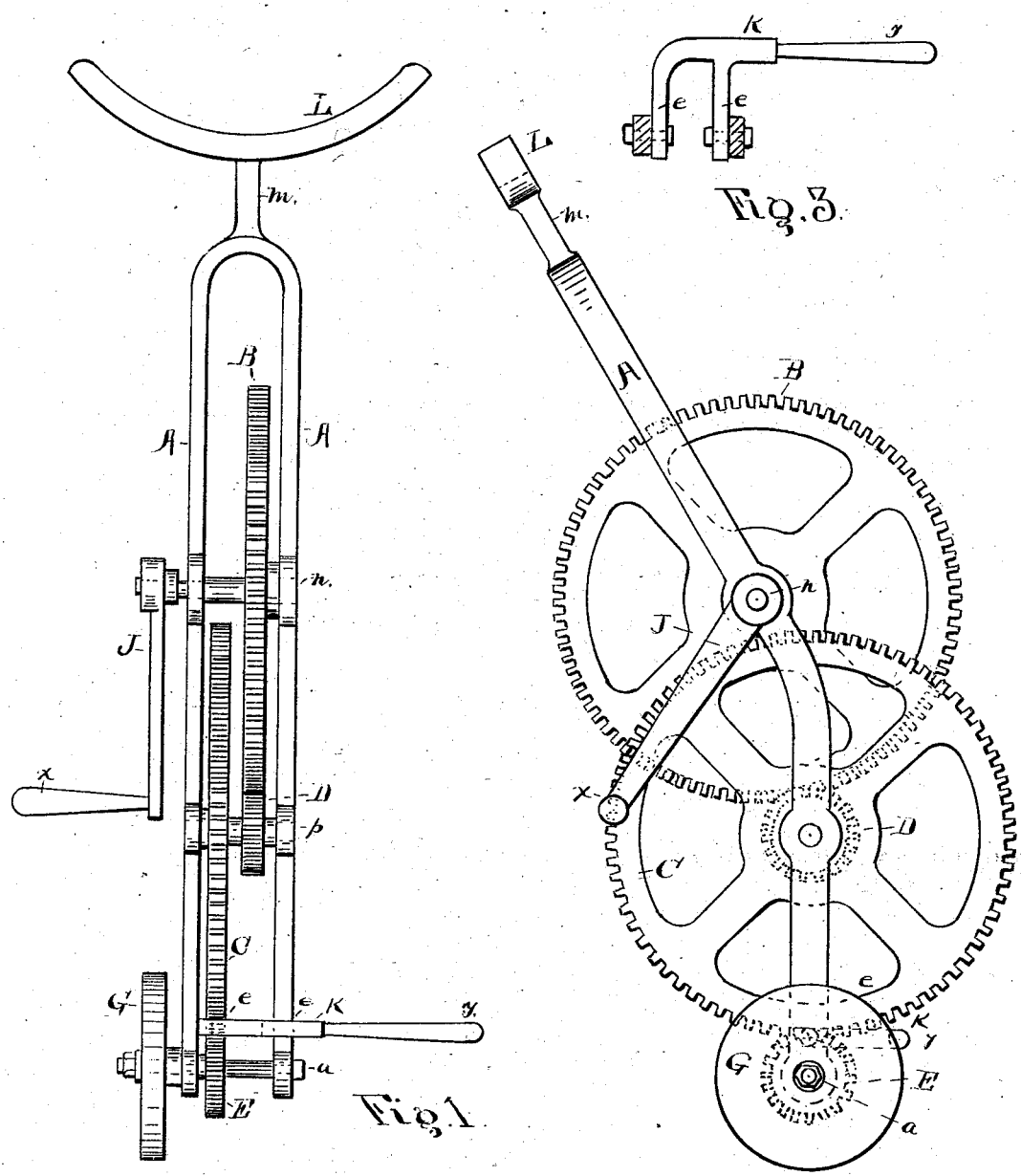

ROBERT R. ISAAC, OF TRENTON, NEW YORK.

MACHINE FOR SHARPENING MOWING-MACHINE KNIVES.

SPECIFICATION forming part of Letters Patent No. 290,236, dated December 18, 1883.

Application filed July 2, 1883. (No model.)

*To all whom it may concern:*

Be it known that I, ROBERT R. ISAAC, of the town of Trenton, in the county of Oneida and State of New York, have invented and discovered a new and useful Improvement in a Machine for Sharpening Mowing-Machine Knives, of which the following is a specification.

My invention relates to improvements in the manner and method of sharpening mowing-machine knives; and the objects of my invention are, first, to provide an apparatus that can always be available and carried on the mowing-machine; second, to afford a sharpener which can reach the vertices of the angles made by the knives without injuring the edge of the contingent knife; third, to produce a machine which by its usefulness will enable a person using the same to save much time and do a greater amount of labor. I attain these objects by the mechanism illustrated in the accompanying drawings, in which—

Figure 1 is a front or top view of the machine, showing the gearing and all the parts. Fig. 2 is a side view of the same, showing the curvature of the frame. Fig. 3 is a view of the projecting brace and handle attached used in adjusting and steadying the machine when in use.

Similar letters refer to similar parts throughout the several views.

The nature and construction of my invention consists of a frame, A, made of any suitable metal or material, which acts as a support or shoulder for three shafts, for the purpose hereinafter stated. The body of the frame curves sufficiently to be easily adjustable when in use, consisting of two parallel pieces, to which, at the upper extremity, where these pieces meet, is an extension of suitable length for a brace to be attached. The frame can be cast in one piece, or separately from the brace, and then fastened by screw, bolt, or any means desirable. The gearing consists of two spur-gears and two pinions supported by the shafts above-mentioned. The spur-gears in this case are of the same diameter and the pinions of the same diameter, causing twenty-five revolutions of the grinding-wheel to one of the crank; but the diameters may vary in any degree without interfering with my invention. The shaft $n$ is furnished with a crank at the end, which extends a suitable distance without the frame, by which the motion is communicated to the grinding-wheel by means of the gearing hereinbefore mentioned and described. Attached to the said crank is a handle of wood or other suitable material. The grinding-wheel consists of emery, stone, or any substance or material used for the purposes of sharpening, and may be of any size to suit the taste and convenience of the person using the same. At the lower extremity of the frame is a projecting brace, to which a handle of wood or any suitable material is attached. One arm of the brace extends from each of the two parallel pieces of the frame, fastened by means of nuts and bolts or any suitable method—in this case by nuts $e\ e$, as indicated in Fig. 3. The object of this handle is to form a brace and means of adjusting the machine when in use.

A person having my machine will do away with the use of the grindstone, which, on account of its size, renders it unable to reach the angles made by the knives, while its weight, unsteadiness, and uneven surface make it unreliable in sharpening mowing-machine knives.

By the use of my machine the knives are not only thoroughly sharpened, but a great deal of time is saved. The sharpener is always present, ready for instant service, and in case the teeth are dulled in some manner the knife is so adjusted in the guard as to have the injured edges of the knives between the guards and sharpened in a short space of time without any other labor than the use of the machine. Again, the knives can be touched up or sharpened at various periods during the day or while the horses are resting, thus keeping the knives continually sharp, and enabling the person using the same to do a much greater amount of work.

Having described the nature and construction of my invention, I will now describe it with reference to the accompanying drawings, in which A represents the frame of the machine. B represents a spur-gear on shaft $n$. C represents a spur-gear on shaft $p$. D represents a pinion on shaft $p$. E represents a like pinion on shaft $a$. G represents the grinding-wheel. J represents the crank which sets in motion grinding-wheel G by means of the gearing. K represents the projection brace on the lower extremity of frame A. L represents the brace which rests against the body when the machine is being used. m represents the extension of the frame to which brace L is attached. n, p, and a represent the shafts supporting the gearing. e e represent the nuts by means of which projection brace K is fastened to frame A. x represents the handle attached to crank J, and y represents the handle attached to projection brace K.

I am aware that machines for grinding or sharpening knives of mowing-machines have been heretofore provided with grinding-stone and operating mechanism connected therewith arranged on a breast-plate, and so arranged as to slide back and forth on the cutters. This I do not claim.

What I claim as my invention and discovery, and which I desire to secure by Letters Patent, is—

The machine consisting of frame A and grinding-wheel G, in combination with wheels B and C, crank J, projecting brace K, brace L, pinions D and E, and shafts n, p, and a, as and for the purposes stated.

Signed at Utica, in the county of Oneida and State of New York.

ROBERT R. ISAAC.

Witnesses:
RICHARD EVANS,
J. K. BROWN.